United States Patent
Goodman et al.

(12)

(10) Patent No.: US 12,405,860 B2
(45) Date of Patent: Sep. 2, 2025

(54) SYSTEM AND METHOD FOR SECURE BACKUP AND RESTORE

(71) Applicant: Dell Products L.P., Round Rock, TX (US)

(72) Inventors: Bradley K. Goodman, Nashua, NH (US); Daniel E. Cummins, Hudson, NH (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/426,797

(22) Filed: Jan. 30, 2024

(65) Prior Publication Data
US 2025/0245104 A1    Jul. 31, 2025

(51) Int. Cl.
*G06F 21/64* (2013.01)
*G06F 11/14* (2006.01)
*G06F 21/60* (2013.01)

(52) U.S. Cl.
CPC ........ *G06F 11/1458* (2013.01); *G06F 21/602* (2013.01); *G06F 21/645* (2013.01)

(58) Field of Classification Search
CPC .................................................. G06F 11/1458
USPC ......................................................... 714/15
See application file for complete search history.

(56) References Cited

U.S. PATENT DOCUMENTS

| | | | |
|---|---|---|---|
| 2005/0283662 A1* | 12/2005 | Li | G06F 11/1469 714/13 |
| 2009/0006640 A1* | 1/2009 | Brouwer | G06F 11/10 713/180 |
| 2017/0230459 A1* | 8/2017 | Lin | H04L 69/04 |
| 2019/0196981 A1* | 6/2019 | Silvert | G06F 21/6218 |
| 2019/0327311 A1* | 10/2019 | Khassanov | H04L 67/02 |
| 2020/0162246 A1* | 5/2020 | Schouppe | H04L 9/0894 |
| 2020/0364058 A1* | 11/2020 | Shankar | G06F 11/1417 |
| 2021/0042437 A1* | 2/2021 | Al-Mousa | G06F 21/6218 |
| 2021/0264014 A1* | 8/2021 | Wu | G06F 21/44 |
| 2023/0315505 A1* | 10/2023 | Erukulla | G06F 9/4416 718/1 |

FOREIGN PATENT DOCUMENTS

CN        116432199 A  *  7/2023  .......... G06F 11/1448

* cited by examiner

*Primary Examiner* — Chae M Ko
(74) *Attorney, Agent, or Firm* — WOMBLE BOND DICKINSON (US) LLP

(57) ABSTRACT

Methods and systems for managing data are disclosed. The data may be managed by creating and requiring use of both backups and verification data for the backups. The verification data may allow the authenticity of the backups to be verified. If verified, the backups may be used to restore the state and/or other characteristics of various entities. The verification data may include information usable to verify integrity of the backups and authority for generating the backups.

20 Claims, 7 Drawing Sheets

SYSTEM AND METHOD FOR SECURE BACKUP AND RESTORE

FIELD

Embodiments disclosed herein relate generally to data integrity. More particularly, embodiments disclosed herein relate to systems and methods to manage the integrity of data.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components, and hosted entities such applications, may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
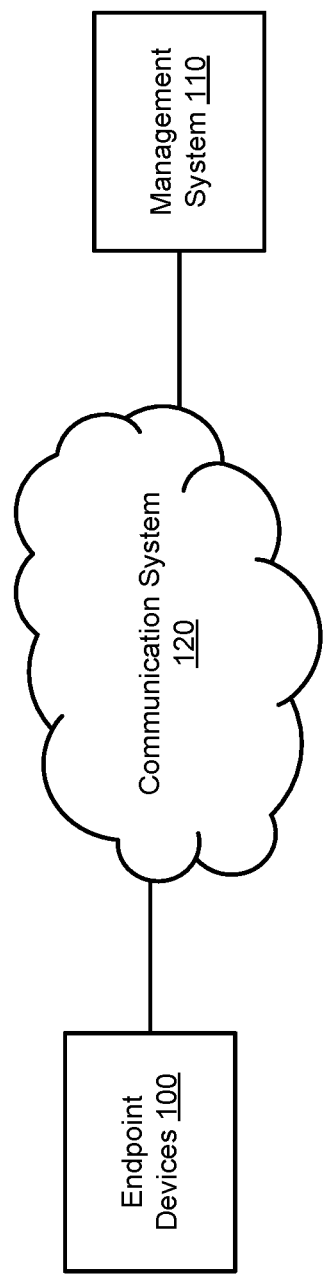
FIGS. 1A-1C show block diagrams illustrating aspects of a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing creation and use of backups for entities. When computer implemented services are provided, data may be generated and stored for future use by applications that participate in the computer implemented services.

However, data may be subject to loss due to a variety of reasons. To reduce the impact of such data loss, backups for the data may be generated and stored for future use. When stored, the backups may be compromised if the entity storing the backups is compromised.

To reduce the likelihood of compromised backups being used, verification data for the backups may be created along with the backups. Prior to use of the backups, the verification data may be used to verify authenticity of the backups.

If the authenticity of the backups can be verified, then the backups may be used to perform restorations. For example, new instances of applications may be instantiated, and the backups may be used to restore the states of the applications to desired operating states (e.g., prior to loss of the data due to, for example, failure of a host endpoint device).

By doing so, embodiments disclosed herein may improve the likelihood that data is available for use in the future. The disclosed embodiments may do so in a secure manner by generating and require use of verification data for backups of the data. Thus, compromised backups may be less likely to be used.

In an embodiment, a method for managing endpoint devices is provided. The method may include identifying a start of a restoration for an entity; based on the identifying of the start: obtaining a mutable data backup for the entity; obtaining verification data for the mutable data backup; attempting to verify the mutable data backup using the verification data; in a first instance of the attempting where the mutable data backup is unable to be verified: terminating the restoration; in a second instance of the attempting where the mutable data backup is able to be verified: completing the restoration of the entity using at least the mutable data backup.

The verification data may include a signed hash of the mutable data backup, and the hash may be signed with a well-known key.

The method may also include obtaining a certificate authenticating authority of the controller of the well-known key to generate the mutable data backup. The certificate may be signed by a certificate authority.

The well-known key may be controlled by an endpoint device.

Obtaining the certificate may include extracting the certificate from an ownership voucher, the ownership voucher delegating authority over the endpoint device from a root of trust to an owner operating the endpoint device during the restoration of the entity.

Attempting to verify the mutable data backup may include making a first attempt to verify that the endpoint device had authority to generate the mutable data backup using the certificate; in a first instance of the first attempt where the endpoint device had authority to generate the mutable data backup: making a second attempt to verify integrity of the backup using the signed hash: in a first instance of the second attempt where the integrity of the backup is verified: concluding that the mutable data backup is verified.

The method may also include obtaining an immutable data backup for the entity.

Completing the restoration may include instantiating an instance of an application using the immutable data backup; and restoring a state of the instance of the application using the mutable data backup.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1A, a block diagram illustrating a system in accordance with an embodiment is shown. The system shown in FIG. 1A may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, data may be generated and stored for future use. Any type and quantity of data may be generated and stored.

Previously stored data may be used to provide the computer implemented services. For example, if the computer implemented services include database services, then data may be stored for future use to service future requests for information stored as part of the database services. If the data is not accessible in the future, then the computer implemented services may not be available, may not be successfully provided, and/or may otherwise be impacted.

Stored data may be inaccessible for a number of different reasons including, for example, activity by a malicious entity, failure of a data processing system, and/or for other reasons.

In general, embodiments disclosed herein may provide methods, systems, and/or devices for managing data in a manner that improves the likelihood of the data being usable in the future. To improve the likelihood of data being usable in the future, backups of the data may be generated and stored. The backups may be used to restore access to the data in the event that, for example, a device hosting a copy of the data fails or become unable to provide access to the data for other reasons.

When such a device becomes unable to provide access to the data, a restoration may be performed. During the restoration, the backup of the data may be used instantiate new copies of the data. For example, in the context of an application and its data, the backup may be used to restore a state of and data previously used by the application in a new instance of the application. While described with respect to restoring in response to data becoming inaccessible, it will be appreciated that the backups may be used to instantiate new instances of previously obtained data for other reasons (e.g., to expand the number of instances of a virtual machine, container, application, etc.) without departing from embodiments disclosed herein.

When a backup is generated, the authenticity of the backup may be questioned in the future. To facilitate verification of the authenticity of a backup in the future, validation data for the backup may also be generated. The validation data may include, for example, (i) content verification data for the backup (e.g., a hash or other data structure usable to validate content of the backup), verification data (e.g., such as a signature generated using a trusted key) for the content verification data, privilege data (e.g., a certificate) attesting that the entity that generated the backup was authorized to do so, and/or other data usable to verify that the backup should be trusted and used for restoration.

Thus, when a restoration is initiated, the authenticity of the backup may be verified using the validation data prior to utilizing the backup for restoration purposes. For example, the privilege data may be checked to ascertain whether a creator of the backup had authority to do so, the verification data for the content verification data may be checked to verify authenticity of the content verification data, and the content verification data may be used to verify that content of the backup has not been modified. For example, between when a backup is obtained and used, various entities may have access to the backup. If any of the entities in the chain of custody of the backup are compromised, then the backup itself may present a security threat. The validation data may be used to verify whether any of the entities in the chain of custody have modified the backup in a manner that may present a security threat (e.g., the backup may be modified to inject vulnerabilities into an endpoint device which utilizes the backup/hosts an entity instantiated using the backup).

Thus, by generating and using validation data to verify the authenticity of the backup prior to use, embodiments disclosed herein may provide a system that is less likely to be compromised due to security threats. Consequently, backups may be generated and stored in computing environments such as edge environments that have elevated risks of entities being compromised (e.g., due to reduced physical security standards, etc.) that are in the chain of custody of such backups.

To provide the above noted functionality, the system of FIG. 1A may include endpoint devices 100 and management system 110. Each of these components is discussed below.

Figure 1B:
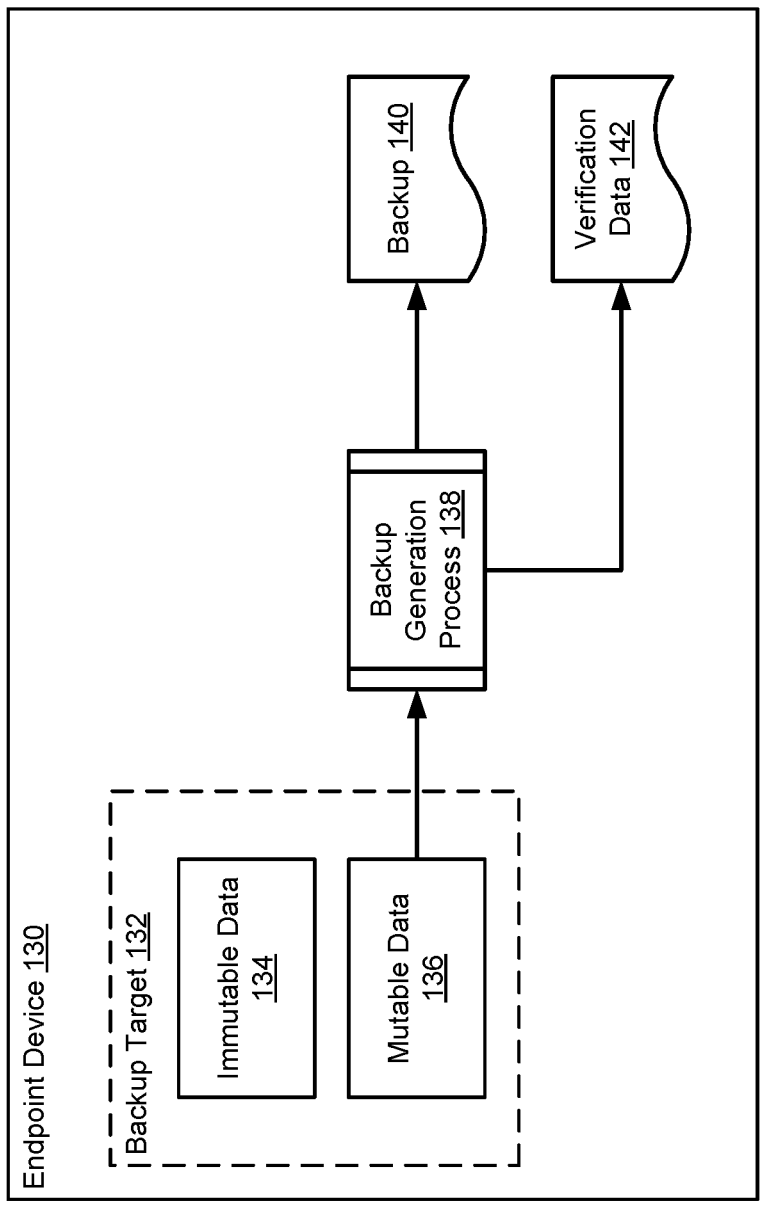
Figure 1C:
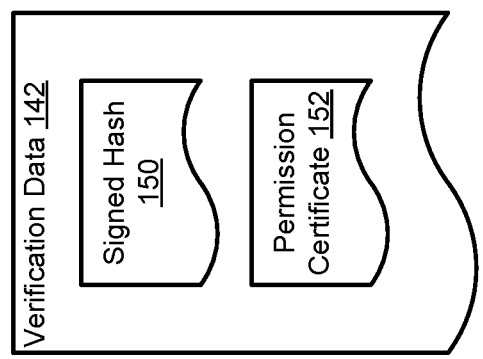

Endpoint devices 100 may provide desired computer implemented services to users thereof and/or other devices operably connected to endpoint devices 100. During the services, desirable data may be generated. To manage risk of loss of the data, endpoint devices 100 may generate backups of the data. Refer to FIGS. 1B-1C for additional details regarding backups.

Once generated, the backups and/or validation data for the backups may be stored with management system 110. Management system 110 may utilize the backups to perform restorations.

Figure 2A:
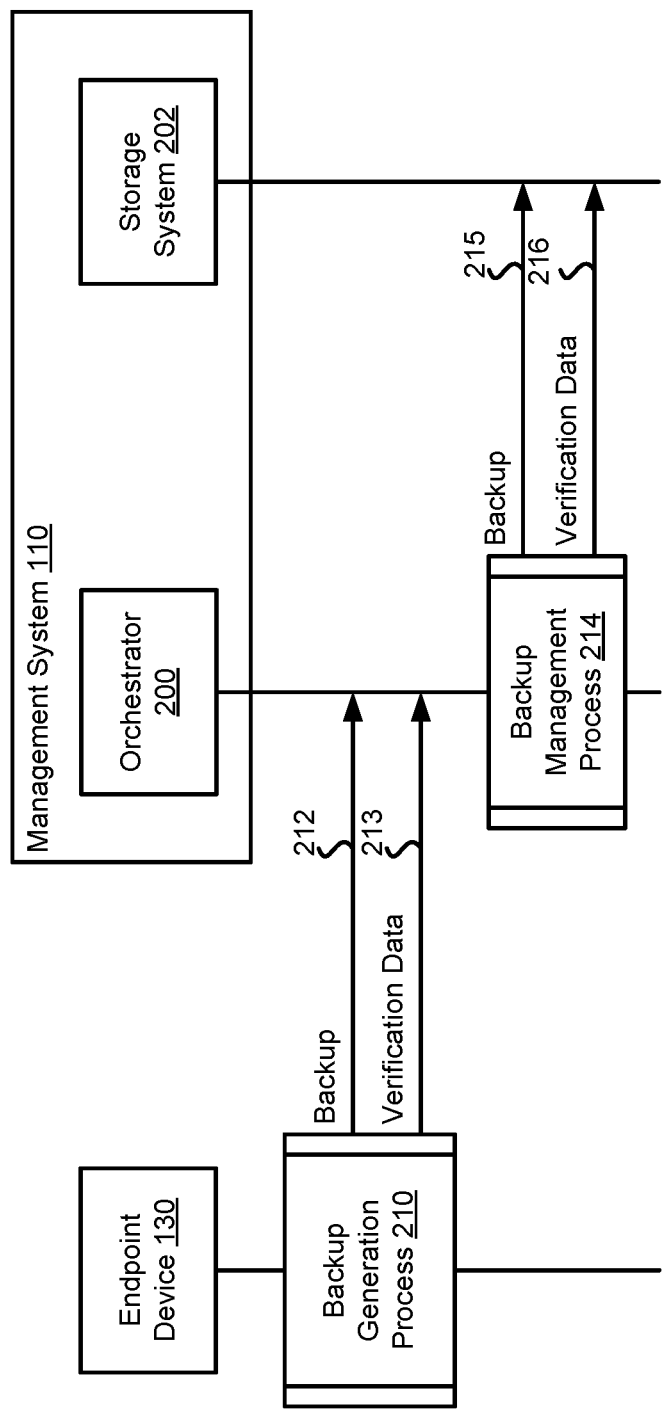
FIGS. 2A-2B show interaction diagrams in accordance with an embodiment.
Figure 2B:
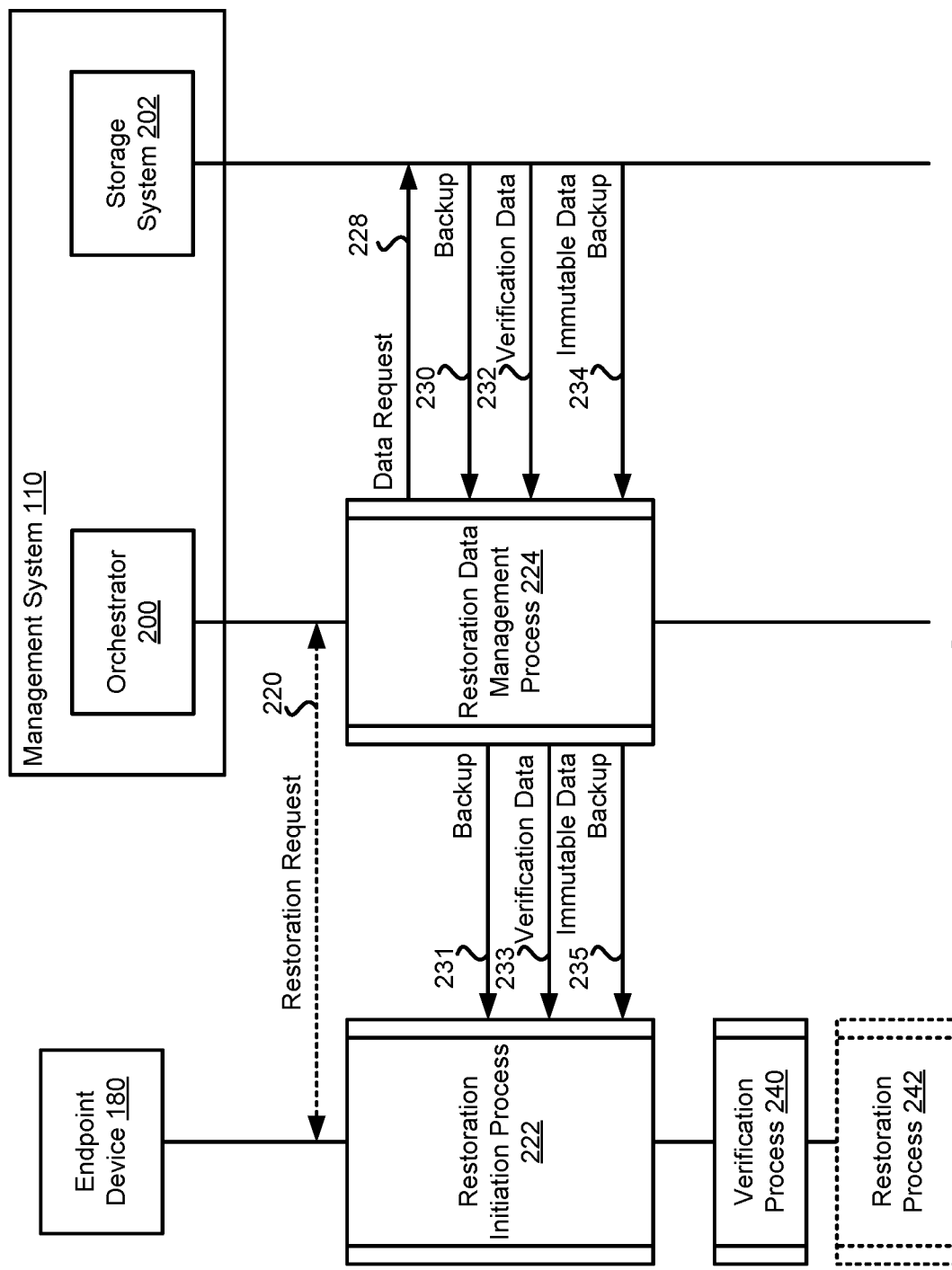

During restorations, endpoint devices 100 may obtain backups and/or validation data, attempt to validate the backups using the validation data, and either terminate or complete restorations using the backups depending on whether the backups are able to be validated. Refer to FIGS. 2A-2B for additional details regarding performance of backups and restorations.

Management system 110 may provide management services for endpoint devices 100. The management services may include (i) obtaining backups and validation data for the backups from endpoint devices 100, and (ii) using the backups and validation data to attempt restorations of entities (e.g., virtual machines, containers, applications, entire endpoint devices, etc.) for which the backups are generated.

Additionally, management system 110 may operate as an orchestrator or other control management entity for endpoint devices 100. Thus, management system 110 may, at least in part, control the operation of endpoint devices 100.

Figure 3:
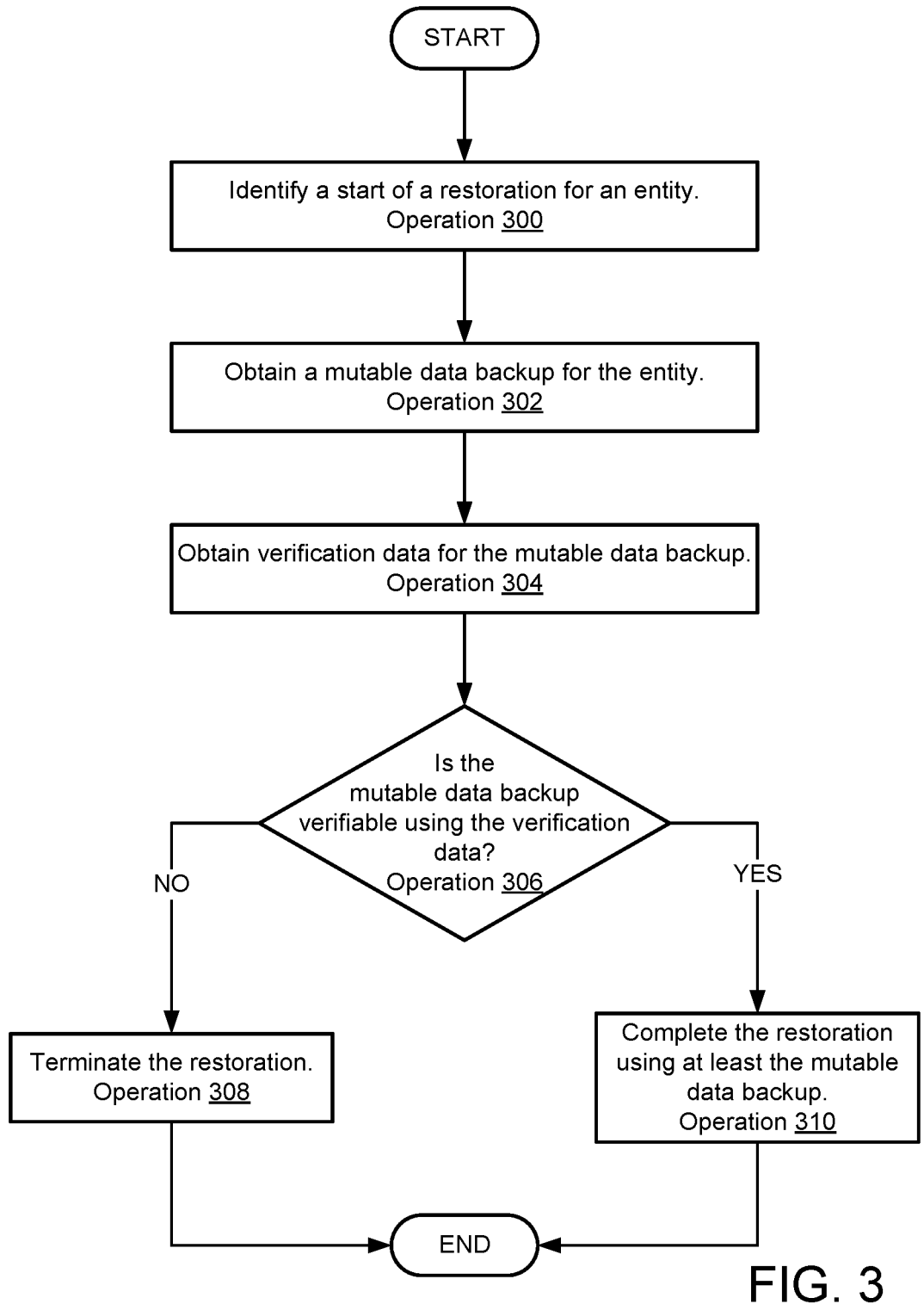
FIG. 3 shows a flow diagram illustrating a method in accordance with an embodiment.

When providing their functionality, any of endpoint devices 100 and management system 110 may perform all, or a portion, of the method illustrated in FIG. 3.

Any of endpoint devices 100 and management system 110 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), and edge device, an embedded system, local controllers, an edge node, and/or any other type of data processing device or system. For additional details regarding computing devices, refer to FIG. 4.

Any of the components illustrated in FIG. 1A may be operably connected to each other (and/or components not illustrated) with communication system 120. Communication system 120 may facilitate communications between the components of FIG. 1A. In an embodiment, communication system 120 includes one or more networks that facilitate communication between any number of components. The networks may include wired networks and/or wireless networks (e.g., and/or the Internet). The networks and communication devices may operate in accordance with any number and types of communication protocols (e.g., such as the Internet protocol).

While illustrated in FIG. 1A as including a limited number of specific components, a system in accordance with an embodiment may include fewer, additional, and/or different components than those illustrated therein.

Turning to FIG. 1B, a diagram of endpoint device 130 in accordance with an embodiment is shown. Any of endpoint devices 100 may be similar to endpoint device 130.

To protect the data generated by endpoint device 130, endpoint device 130 may perform backup generation process 138. During backup generation process 138, a backup (e.g., 140) for a backup target (e.g., 132, may be an application, virtual machine, container, etc.) may be obtained. The backup may be obtained by (i) discriminating mutable data 136 (e.g., application data or other types of data that changes due to operation of backup target 132) from immutable data 134 (e.g., program code data or other types of data that does not change to operation of backup target 132), and (ii) populating backup 140 with information usable to reconstruct, recreate, and/or otherwise obtain a copy of mutable data 136 using backup 140 alone or in combination with other data. For example, backup 140 may include data representative of a current state of mutable data 136, data representative of a change in state of mutable data 136 from another state, etc.

Once backup 140 is obtained, verification data 142 may be obtained. Verification data 142 may include information usable to ascertain the authenticity of backup 140. For example, verification data 142 may include (i) a hash or other data usable to verify that content of backup 140 has not been modified after being created, (ii) a signature for the hash or other data usable to verify that a particular entity created or at least agrees that the hash is trustworthy, (iii) a certificate or other data usable to verify that the entity that created or at least agrees that the hash is trustworthy had authority to create or attest the authenticity of backup 140, and/or other data usable to verify authenticity of backup 140. Refer to FIG. 1C for an example of content of verification data 142.

Once backup 140 and verification data 142 are obtained, both may be stored with a management system or other entity for retention.

Turning to FIG. 1C, a diagram of verification data 142 in accordance with an embodiment is shown. As noted above, verification data 142 may include information usable to verify authenticity of a backup.

For example, verification data 142 may include signed hash 150 and permission certificate 152. Signed hash 150 may be a hash of a backup that is signed using a trusted key. The trusted key may be a key managed by a trusted platform module of an endpoint device that created backup 140. The trusted key may be a symmetric key, or may be a private key of a public-private key pair.

Permission certificate 152 may be a cryptographically verifiable certificate delegating authority to create backups to the endpoint device. For example, permission certificate 152 may include (i) a statement delegating authority to create backups (or attest authenticity of backups), (ii) limitations on the delegated authority such as scope (e.g., only for backups created within a particular computer cluster or other limitation on the delegated authority), (iii) a signature from a trusted entity with authority to delegate such backup creation authority.

For example, the delegation statement may include a public key for the endpoint device. The limitation on the delegated authority may specify address ranges or other identifiers usable to discriminate validly from invalidly attested backups. The signature from the trusted entity may be, for example, from (i) a certificate authority if the certificate is a x509 and/or extended x509 type certificate, (ii) a root authority (e.g., root of trust for endpoint devices) or entity delegated such authority by the root authority, and/or other entities.

For example, each of the endpoint devices may be given a root authority when manufactured. Authority over the endpoint devices may then be delegated using certificate chains that each delegate authority to other entities. Such certificates may include delegation statements, public keys associated with the entities to which the authority is delegated, signatures made using private keys of the entities making the delegations (e.g., thereby allowing the certificates to be verified using corresponding public keys), and/or other information. Such certificate chains may be established and distributed to endpoint devices during onboarding.

During onboarding an ownership voucher that includes such certificate chains may be used by orchestrators or other management entities (e.g., of a new owner) that attempt to take over management of the endpoint devices. The ownership voucher may allow the endpoint devices to verify that the orchestrators have been delegated authority over them (e.g., by sequentially cryptographically verifying authenticity of delegation statements included in the certificates). The certificates usable to demonstrate the authority of each endpoint device to generate backups may be validated using these and/or other certificates.

To further clarify embodiments disclosed herein, interactions diagrams in accordance with an embodiment are shown in FIGS. 2A-2B. These interactions diagrams may illustrate how data may be obtained and used within the system of FIGS. 1A-1C.

In the interaction diagrams, processes performed by and interactions between components of a system in accordance with an embodiment are shown. In the diagrams, components of the system are illustrated using a first set of shapes (e.g., 200, 202, etc.), located towards the top of each figure. Lines descend from these shapes. Processes performed by the components of the system are illustrated using a second set of shapes (e.g., 130, 200, etc.) superimposed over these lines. Interactions (e.g., communication, data transmissions, etc.) between the components of the system are illustrated using a third set of shapes (e.g., 212, 216, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 212 may occur prior to the interaction labeled as 216. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate processes and interactions that may occur during backup generation process to obtain backups for entities.

To obtain a backup of data for an entity, endpoint device 130 may perform backup generation process 210. Refer to FIG. 1B and the corresponding description for additional details regarding backup generation process 210.

During backup generation process, a backup and verification for the backup may be obtained. At interactions 212 and 213, the backup and verification may be provided to management system 110 for management. For example, management system 110 may include orchestrator 200 and storage system 202. Orchestrator 200 may manage endpoint device 130 by, for example, setting backup schedules (e.g., when backups are to be generated), may manage backups of entities for future use, may instruct endpoint device 130 and/or other endpoint devices of a deployment, etc. Storage system 202 may store data for future use. For example, storage system 202 may be a storage service, a cloud storage, a storage array, and/or other types of entities that may provide data storage services. While illustrated separately, in an embodiment, orchestrator 200 and storage system 202 are the same entity while in other embodiments orchestrator 200 and storage system 202 are distinct entities (e.g., different hardware devices).

Once backup and verification data for the entity are obtained, orchestrator 200 may perform backup management process 214. During backup management process, the backup and verification data for the backup may be stored for long term retention. For example, at interactions 215 and 216, the backup and verification data may be stored with storage system 202. When so stored, the backup and verification data may be cataloged for future use (e.g., associated with the entity, associated with other backups that have been previously generated, etc.).

In addition to storing a backup for mutable data of the entity, storage system 202 may also store images or other representations of immutable data of the entity. For example, storage system 202 may store images of applications in a particular state (e.g., after initial installation). The combination of these backups for immutable data in combination with the backup for the mutable data may allow for a new instance of an entity to be instantiated and updated to reflect the state of the entity at the time the backup of the mutable data is generated. Thus, for restoration purposes, backups of mutable and immutable data may be utilized.

Thus, using the flow shown in FIG. 2A, embodiments disclosed herein may facilitate generation and storage of backups usable to restore various entities to operating states corresponding to the points in time backups of mutable data for the entities are generated.

Turning to FIG. 2B, a second interaction diagram in accordance with an embodiment is shown. The second interaction diagram may illustrate processes and interactions that may occur during restorations of entities.

To restore and entity, one or more entities may, at interaction 220, issue restoration requests to (i) a target entity to which the entity is to be restored, (ii) management system 110, and/or other entities. In FIG. 2B, interaction 220 is drawn in dashing to indicate that any of the entities shown in FIG. 2B may issue the restoration request or other entities may issues the restoration request. For example, a higher level management system (not shown) may send the restoration request requests to any of the entities (e.g., 180, 110) shown in FIG. 2B. The restoration request may specify the target entity (e.g., in this example endpoint device 180), and the entity to be restored.

When received by orchestrator 200, orchestrator 200 may perform restoration data management process 224. During restoration data management process 224, management system 110 may identify one or more backups relevant for the restoration. For example, the name of the entity that is to be restored may be obtained from the restoration request and may be used to identify the backups (e.g., backups may be indexed based on entities for which they may be used to perform restorations). Once identified, at interaction 228, a data request for the backups and corresponding verification data may be sent to storage system 202.

In response to receiving the data request, storage system 202 may identify the relevant backups and corresponding verification data for backups of mutable data. The backups may include backups of mutable and/or immutable data. It will be appreciated that backups of immutable data may be signed and/or may otherwise be cryptographically verifiable.

Once identified, at interactions 230, 232, and 234, the backups of the mutable data, the backups of the immutable data, and the verification data may be provided to orchestrator 200. Orchestrator 200 may, at interactions 231, 233, and 235, forward the backups and validation data to endpoint device 180.

Like orchestrator 200, endpoint device 180 may respond to receiving the restoration request by starting performance of a restoration. For example, endpoint device 180 may begin to perform restoration initiation process 222.

During restoration initiation process 222, endpoint device 180 may receive and/or otherwise obtain relevant backups and/or validation data. While illustrated in FIG. 2B as obtaining all of the backups and validation data from management system 110, it will be appreciated that some of the backups and/or validation data may be obtained from other sources. For example, backups of immutable data may be obtained from other entities while the backups of the mutable data may be obtained from management system 110, vice versa, etc.

As backups are obtained, the backups may be paired with corresponding validation data. Once the relevant backups and verification data are obtained, endpoint device 180 may perform verification process 240. During verification process 240, endpoint device 180 may attempt to verify the integrity of the backups.

For backups of mutable data, endpoint device 180 may (i) use certificates to attempt to verify authority of the generators of the backups to generate backups, (ii) presuming that authority for generation can be verified, the integrity of hashes (or other verification data) for the backups may be verified by checking signatures, and (iii) presuming that the integrity of the hashes can be verified, the integrity of the backups may be verified. If the authority for generating backups, integrity of the hashes (or other data structures), and integrity of the backups is generated, then the backups may be treated as be authentic, and may be used to perform restoration process 242 (drawn in dashing to indicate that the specific process may depend on the outcome of verification process 240).

If the backups cannot be verified as being authentic (e.g., any of the authority/integrity checks being failed), then the restoration may be terminated, suspended, and/or otherwise modified so that the backups are not used.

In addition to verifying the backups of mutable data, the authenticity of the backups of the immutable data may also attempt to be verified. Unlike the backups of the mutable data that may be signed by an endpoint device, the backups of the immutable data may be signed by a higher level management entity or another entity. Thus, the signature may be used to verify trust in and integrity of the backups of the immutable data.

If all of the backups can be authenticated, then during restoration process 242 the backups may be used to instantiate new instances of entities and update the states of the newly instantiated entities. For example, if the immutable backup is a software image, then a new instance of the software may be instantiated. The mutable backup may then be used to update the state data, application data, and/or other portions of data for the software to place the software in a state similar (or identical) to that of a different instance of the software when the backup of the mutable data was generated. In this manner, an entity may be restored to a predetermined state, a new instance of the entity may be generated having the prescribed state (e.g., to scale instances of a piece of software), etc.

Thus, using the flow shown in FIG. 2B, embodiments disclosed herein may facilitate restoration of entities in a secure manner.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIG. 1A may perform various methods to verify operations to manage the operation of endpoint devices. FIG. 3 illustrates a method that may be performed by the components of the system of FIG. 1A. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for restoring an entity in accordance with an embodiment is shown. The method may be performed by any of the components of the system shown in FIG. 1A.

Prior to operation 300, a request for restoration of an entity may be initiated by an entity. The entity may be an endpoint device, a management system, or another data processing system.

At operation 300, a start of a restoration for an entity may be identified. The start may be identified by obtaining the request for the restoration, or by obtaining other information indicating that a restoration for the entity is to be performed. The request for the restoration may indicate the entity, and a target entity to which the entity is to be restored. For example, the request may specify or otherwise indicate and endpoint device to which the entity is to be restored.

At operation 302, a mutable data backup for the entity is obtained. The mutable data backup for the entity may be obtained by reading it from storage, receiving it from another device, and/or via other methods. For example, a management system may send the mutable data backup to facilitate the mutable data backup being obtained.

At operation 304, verification data for the mutable data backup may be obtained. The verification data may be obtained similarly to how the mutable data backup is obtained. The verification data may include a signed hash of the mutable data backup, a permission certificate, and/or other types of data structures.

At operation 306, a determination is made regarding whether the mutable data backup is verifiable using the verification data. The determination may be made by attempting to verify (i) authority of a creator of the mutable data backup to create backups, (ii) integrity of data (e.g., a hash) from the verification data usable to verify the integrity of the mutable data backup, and (iii) integrity of the mutable data backup.

The authority of the creator of the mutable data backup may be verified by checking the permission certificate. The permission certificate may specify delegations of authority to the entity that created the backup. So long as any limitations specified by the permission certificate are not violated (e.g., the mutable data backup being outside the scope of the delegated authority) and the certificate can be validated (e.g., by using a signature from the certificate to verify that the entity making the delegation is both trusted and has authority to make such delegations, and that the delegation statement have not been modified), then the authority of the creator may be valid.

The specific mechanism for verifying the certificate may depend on the type of certificate that is presented. For example, if the certificate is a X509 certificate, then certificate authority verification procedures may be used. In another example, the certificate may be validated by establishing a certificate chain (e.g., using certificates form an ownership voucher and/or other sources) back to a root of authority for a device performing the verification.

If the permission certificate can be verified, then a signed hash or other data structure may be verified. For example, the signed hash may be verified by confirming that the hash is signed by the entity to which the permission certificate delegates authority to create backups. If so signed, then a signature verification algorithm may be used to verify integrity of the hash.

If the signed hash can be verified, then the integrity of the mutable data backup may be verified using the hash. For example, a new hash of the mutable data backup may be generated (e.g., using a hashing algorithm which is presumed to have been used to generate the hash) and compared to the hash. If the new hash and the hash match, then the mutable data backup may be presumed to have not been modified after creation, and treated as being verified.

If the mutable data backup is verifiable using the verification data, then the method may proceed to operation 310. Otherwise the method may proceed to operation 308.

It will be appreciated, however, that other backups may be used during restorations beyond the mutable data backup. The method may only proceed to operation 310 if all of the backups may be verified.

At operation 308, the restoration may be terminated. The restoration may be terminated by refusing to allow the mutable data backup to be used to perform the restoration. The method may end following operation 308.

Returning to operation 306, the method may proceed to operation 310 when the mutable data backup is verifiable (and all other backups necessary to perform a restoration are also verifiable).

At operation 310, the restoration is completed using at least the mutable data backup. The restoration may be completed by using the mutable data backup to restore a state of an entity. For example, a new instance of an application may be instantiated using an immutable data backup, and the mutable data backup may be used to set configuration settings, application data, etc. to place the application into a state of operation that is similar (or identical to) a state of operation of another instance of the application for which the mutable data backup was obtained.

The method may end following operation 310.

Thus, using the method shown in FIG. 3, embodiments disclosed herein may facilitate restoration of entities using backups while managing risk in the use of backups. By requiring that backups be verified prior to use, the used backups may be less likely to cause endpoint devices to present vulnerability due to compromise of the backups, to comprise the endpoint devices directly, etc.

Figure 4:
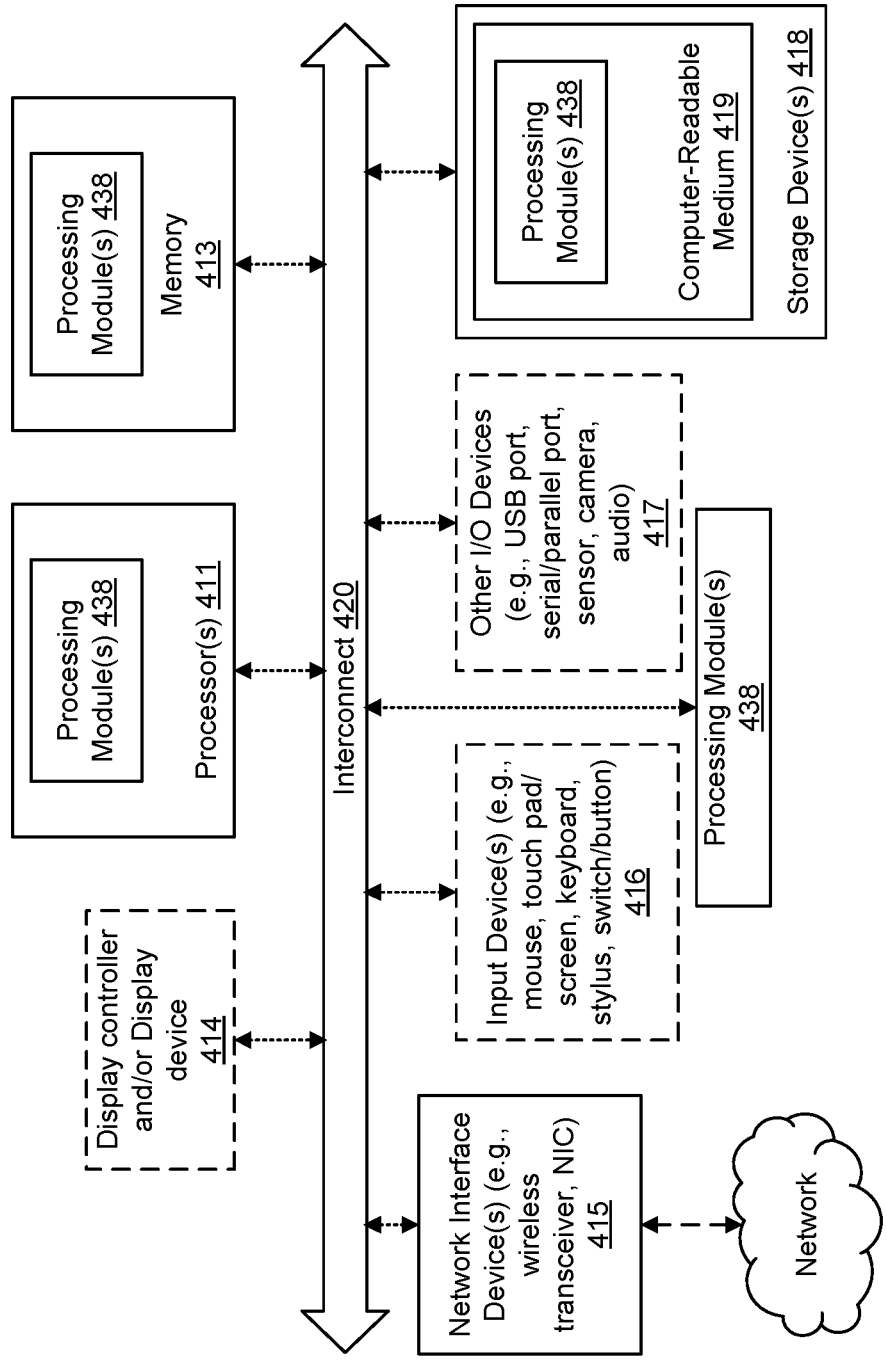
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above.

Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing endpoint devices, the method comprising:
   identifying a start of a restoration for an entity;
   based on the identifying of the start:
      obtaining a mutable data backup for the entity;
      obtaining verification data for the mutable data backup;
      attempting to verify the mutable data backup using the verification data;
      in a first instance of the attempting where the mutable data backup is unable to be verified:
         terminating the restoration; and
      in a second instance of the attempting where the mutable data backup is able to be verified:
         completing the restoration of the entity using at least the mutable data backup.

2. The method of claim 1, wherein the verification data comprises a signed hash of the mutable data backup, and the hash is signed with a well-known key.

3. The method of claim 2, further comprising obtaining a certificate authenticating authority of a controller of the well-known key to generate the mutable data backup.

4. The method of claim 3, wherein the certificate is signed by a certificate authority.

5. The method of claim 3, wherein the well-known key is controlled by an endpoint device.

6. The method of claim 5, wherein obtaining the certificate comprises extracting the certificate from an ownership voucher, the ownership voucher delegating authority over the endpoint device from a root of trust to an owner operating the endpoint device during the restoration of the entity.

7. The method of claim 5, wherein attempting to verify the mutable data backup comprises:
   making a first attempt to verify that the endpoint device had authority to generate the mutable data backup using the certificate; and
   in a first instance of the first attempt where the endpoint device had authority to generate the mutable data backup:
      making a second attempt to verify an integrity of the mutable data backup using the signed hash, and
      in a first instance of the second attempt where the integrity of the mutable data backup is verified:
         concluding that the mutable data backup is verified.

8. The method of claim 1, further comprising:
   obtaining an immutable data backup for the entity.

9. The method of claim 8, wherein completing the restoration comprises:
   instantiating a new instance of an existing application that needs to be restored as part of the restoration using the immutable data backup to obtain a first application instance as the new instance and a second application instance as the existing application; and
   restoring a state of the first application instance using the mutable data backup, the first application instance and the second application instance both existing on the entity after the restoration of the entity is completed.

10. The method of claim 1, wherein attempting to verify the mutable data backup using the verification data comprises:
    making a first attempt to verify that a separate entity that signed a signed hash of the mutable backup data had authority to generate the mutable data backup using a certificate that authenticates the authority, the separate entity being different from the entity;
    in a first instance of the first attempt where the separate entity had the authority:
       making a second attempt to verify an integrity of the mutable data backup using the signed hash of the mutable data backup; and
       in a first instance of the second attempt where the integrity of the mutable data backup is verified:
          concluding that the mutable data backup is verified.

11. The method of claim 1, wherein the verification data comprises a signed cryptographic key of the mutable backup data, and attempting to verify the mutable data backup using the verification data comprises:
    making a first determination that a separate entity that signed the signed cryptographic key had authority to generate the mutable data backup, the first determination being made using a certificate that authenticates the authority, the separate entity being different from the entity;
    using, after the first determination, the signed cryptographic key to verify an integrity of the mutable data backup; and
    concluding, in a first instance of the using where the integrity of the mutable data backup is successfully verified using the signed cryptographic key, that the mutable data backup is verified.

12. A non-transitory machine-readable medium having instructions stored therein, which when executed by a processor, cause the processor to perform operations for managing endpoint devices, the operations comprising:
    identifying a start of a restoration for an entity;
    based on the identifying of the start:
       obtaining a mutable data backup for the entity;
       obtaining verification data for the mutable data backup;

attempting to verify the mutable data backup using the verification data;

in a first instance of the attempting where the mutable data backup is unable to be verified:
   terminating the restoration; and in a second instance of the attempting where the mutable data backup is able to be verified:
   completing the restoration of the entity using at least the mutable data backup.

13. The non-transitory machine-readable medium of claim 12, wherein the verification data comprises a signed hash of the mutable data backup, and the hash is signed with a well-known key.

14. The non-transitory machine-readable medium of claim 13, wherein the operations further comprise obtaining a certificate authenticating authority of a controller of the well-known key to generate the mutable data backup.

15. The non-transitory machine-readable medium of claim 14, wherein the certificate is signed by a certificate authority.

16. The non-transitory machine-readable medium of claim 14, wherein the well-known key is controlled by an endpoint device.

17. The non-transitory machine-readable medium of claim 16, wherein obtaining the certificate comprises extracting the certificate from an ownership voucher, the ownership voucher delegating authority over the endpoint device from a root of trust to an owner operating the endpoint device during the restoration of the entity.

18. The non-transitory machine-readable medium of claim 16, wherein attempting to verify the mutable data backup comprises:

making a first attempt to verify that the endpoint device had authority to generate the mutable data backup using the certificate; and in a first instance of the first attempt where the endpoint device had authority to generate the mutable data backup:
     making a second attempt to verify an integrity of the mutable data backup using the signed hash, and
     in a first instance of the second attempt where the integrity of the mutable data backup is verified:
       concluding that the mutable data backup is verified.

19. A data processing system, comprising:

a processor; and a memory coupled to the processor to store instructions, which when executed by the processor, cause the processor to perform operations for managing endpoint devices, the operations comprising:

identifying a start of a restoration for an entity;

based on the identifying of the start:
   obtaining a mutable data backup for the entity;
   obtaining verification data for the mutable data backup;
   attempting to verify the mutable data backup using the verification data;
   in a first instance of the attempting where the mutable data backup is unable to be verified:
     terminating the restoration; and
   in a second instance of the attempting where the mutable data backup is able to be verified:
     completing the restoration of the entity using at least the mutable data backup.

20. The data processing system of claim 19, wherein the verification data comprises a signed hash of the mutable data backup, and the hash is signed with a well-known key.

* * * * *